United States Patent
Vincelli et al.

(10) Patent No.: US 9,547,737 B2
(45) Date of Patent: Jan. 17, 2017

(54) SUPPORT SYSTEM AND A METHOD OF GENERATING AND USING FUNCTIONAL SAFETY DATA FOR AN ELECTRONIC COMPONENT

(71) Applicant: Renesas Electronics Europe Limited, Bourne End, Buckinghamshire (GB)

(72) Inventors: Riccardo Vincelli, Bourne End (GB); Agostino Cefalo, Bourne End (GB); Claudio Tongiani, Bourne End (GB)

(73) Assignee: RENESAS ELECTRONICS EUROPE LIMITED, Buckinghamshire (GB)

( * ) Notice: Subject to any disclaimer, the term of this patent is extended or adjusted under 35 U.S.C. 154(b) by 304 days.

(21) Appl. No.: 14/156,593

(22) Filed: Jan. 16, 2014

(65) Prior Publication Data

US 2014/0200699 A1 Jul. 17, 2014

(30) Foreign Application Priority Data

Jan. 17, 2013 (EP) .................................... 13151603

(51) Int. Cl.
G06F 19/00 (2011.01)
G06F 17/50 (2006.01)
G06F 17/30 (2006.01)
G06F 11/00 (2006.01)

(52) U.S. Cl.
CPC ......... *G06F 17/5054* (2013.01); *G06F 11/008* (2013.01); *G06F 17/30286* (2013.01)

(58) Field of Classification Search
CPC ................................................ G06F 17/5054
USPC .................................................. 700/95–129
See application file for complete search history.

(56) References Cited

U.S. PATENT DOCUMENTS

| | | | | |
|---|---|---|---|---|
| 4,788,531 A | * | 11/1988 | Corwin ................... | H04L 69/40 340/945 |
| 5,596,712 A | * | 1/1997 | Tsuyama ............. | G06F 11/2257 714/26 |
| 5,636,344 A | * | 6/1997 | Lewis ................. | G06F 11/2257 709/224 |
| 2007/0255444 A1 | * | 11/2007 | Kauffman .............. | G06Q 10/00 700/117 |
| 2008/0256383 A1 | * | 10/2008 | Bose ...................... | G06F 11/008 714/1 |
| 2010/0223276 A1 | * | 9/2010 | Al-Shameri ...... | G06F 17/30333 707/769 |
| 2013/0204484 A1 | * | 8/2013 | Ricci ....................... | G06F 17/00 701/29.4 |
| 2013/0317780 A1 | * | 11/2013 | Agarwal ............ | G05B 23/0248 702/181 |

(Continued)

FOREIGN PATENT DOCUMENTS

EP 1980964 A1 10/2008

OTHER PUBLICATIONS

Arnould, Richard J., and Henry Grabowski. "Auto safety regulation: An analysis of market failure." The Bell Journal of Economics (1981): pp. 27-48.*

(Continued)

*Primary Examiner* — Satish Rampuria
(74) *Attorney, Agent, or Firm* — Gregory E. Montone; Roberts Mlotkowski Safran, Cole & Calderon, P.C.

(57) ABSTRACT

A design support system and a method of generating and using a customizable analysis report comprising functional safety data for an electronic component, such as microcontroller, are described.

14 Claims, 19 Drawing Sheets

(56) References Cited

U.S. PATENT DOCUMENTS

2014/0173548 A1* 6/2014 Greb .................... G06F 11/008
716/136

OTHER PUBLICATIONS

Campbell, John L., et al. "Comprehension testing of active safety symbols." SAE International (2004). pp. 1-7.*
Zanoni, Enrico, and Paolo Pavan. "Improving the reliability and safety of automotive electronics." Micro, IEEE 13.1 (1993): pp. 30-48.*

* cited by examiner

Table 8₁:

| Failure rate characteristic | Failure rate | Unit |
|---|---|---|
| Failure rate_DIGITAL | 1.00E-08 | FIT/um2 |
| Failure rate_MEMORY | 1.00E-08 | FIT/um2 |
| Failure rate_ANALOG_pwr | 1.00E-08 | FIT/um2 |
| Failure rate_ANALOG_clk | 1.00E-08 | FIT/um2 |
| ... | | |

Table 8₂:

| Fault Characterisation | FM1 | | FM2 | | FM3 | | FM4 | |
|---|---|---|---|---|---|---|---|---|
| | FM name | % | FM name | % | FM name | % | FM name | % |
| Fault_charact_DIGITAL | stuck_at_0 | 45 | stuck_at_1 | 45 | stuck_open | 8 | bridge | 2 |
| Fault_charact_MEMORY | 1bit_corruption | 90 | 2bit_corruption | 2 | multibit_corruption | 8 | | |
| Fault_charact_ANALOG_pwr | under_voltage | 35 | over_voltage | 35 | drift | 20 | oscillation | 10 |
| Fault_charact_ANALOG_clk | under_frequency | 45 | over_frequency | 45 | jitter | 10 | | |
| ... | | | | | | | | |

Table 8₃:

| Parameter | Value | Unit |
|---|---|---|
| fault_tolerant_time_interval | 0.5 | s |
| mpf_detection_interval | 3600 | s |
| T_life | 3.6E+06 | s |
| ... | | |

Fig. 11

| ID | Element name | Safety related | Fault Characterisation | Failure rate characteristic |
|---|---|---|---|---|
| ... | ... | ... | ... | ... |
| 10 | Element10 | y | Fault_charact_MEMORY | Failure rate_MEMORY |
| 11 | Element12 | y | Fault_charact_DIGITAL | Failure rate_DIGITAL |
| 12 | Element13 | y | Fault_charact_DIGITAL | Failure rate_DIGITAL |
| 13 | Element14 | y | Fault_charact_DIGITAL | Failure rate_DIGITAL |
| 14 | Element15 | y | Fault_charact_DIGITAL | Failure rate_DIGITAL |
| 15 | Element16 | y | Fault_charact_DIGITAL | Failure rate_DIGITAL |
| 16 | Element17 | n | Fault_charact_DIGITAL | Failure rate_DIGITAL |
| 17 | Element18 | y | Fault_charact_ANALOG_pwr | Failure rate_ANALOG_pwr |
| 18 | Element19 | y | Fault_charact_ANALOG_clk | Failure rate_ANALOG_clk |
| ... | ... | ... | ... | ... |

Fig. 12

| Fault | Fault impact | | |
|---|---|---|---|
| | DVF | IVF | NVF |
| Fault1 | X | - | - |
| Fault2 | X | - | - |
| Fault3 | - | X | - |
| Fault4 | X | - | - |
| ... | ... | ... | ... |

Fig. 15

| Fault | Fault impact | | |
|---|---|---|---|
| | DVF | IVF | NVF |
| ... | ... | ... | ... |
| core.cpu.alu.node1 | X | - | - |
| core.cpu.alu.node2 | - | X | - |
| core.cpu.alu.node3 | - | - | X |
| ... | ... | ... | ... |
| core.cpu.node7 | X | - | - |
| core.cpu.node8 | X | - | - |
| ... | ... | ... | ... |

Fig. 16

| Fault | SM1 | | SM2 | | SM3 | | SM4 | | ... | |
|---|---|---|---|---|---|---|---|---|---|---|
| | C | D | C | D | C | D | C | D | C | D |
| Fault1 | X | - | - | - | - | X | - | - | ... | ... |
| Fault2 | - | - | X | - | - | - | X | X | ... | ... |
| Fault3 | - | - | X | - | - | - | X | X | ... | ... |
| ... | ... | ... | ... | ... | ... | ... | ... | ... | ... | ... |

| ID | Element name | Fault characterisation FM name | Fault impact DVF (%) | IVF (%) | NVF (%) | SM ID | Fault coverage SMr1 FC | | | |
|---|---|---|---|---|---|---|---|---|---|---|
| | | | | | | | C (%) | D (%) | CD (%) | U (%) |
| 1 | Element1 | 1bit_corruption | 100 | 0 | 0 | 3 | 0 | 0 | 100 | 0 |
| 1 | Element1 | 2bit_corruption | 100 | 0 | 0 | 3 | 0 | 100 | 0 | 0 |
| 1 | Element1 | N-bit corruption | 100 | 0 | 0 | 3 | 0 | 97 | 0 | 3 |
| 2 | Element2 | stuck_at_0 | 100 | 0 | 0 | 10 | 0 | 99 | 0 | 1 |
| 2 | Element2 | stuck_at_1 | 100 | 0 | 0 | 10 | 0 | 99 | 0 | 1 |
| 2 | Element2 | stuck_at_open | 100 | 0 | 0 | 10 | 0 | 93 | 0 | 7 |
| ... | ... | ... | ... | ... | ... | ... | ... | ... | ... | ... |
| 8 | Element8 | under_voltage | 100 | 0 | 0 | - | 0 | 0 | 0 | 100 |
| 9 | Element9 | jitter | 100 | 0 | 0 | 1 | 0 | 60 | 0 | 40 |
| ... | ... | ... | ... | ... | ... | ... | ... | ... | ... | ... |

Fig. 22

| ID | Element name | Lambda | | | | | HW metrics | | PMHF |
|---|---|---|---|---|---|---|---|---|---|
| | | SPF | RF | MPF_LAT | MPF_DET | SAFE | SPFM | LFM | |
| 1 | Element1 | 0 | 7.62E-08 | 0 | 7.5438E-06 | 0 | 99 | 100 | 7.62E-17 |
| 2 | Element2 | 0 | 0 | 5.85E-08 | 1.2415E-06 | 0 | 100 | 95.5 | 2.63777E-29 |
| 3 | Element3 | 0 | 0 | 4.509E-07 | 9.5671E-06 | 0 | 100 | 95.5 | 0 |
| 4 | Element4 | 0 | 1.42372E-05 | 0 | 0.000302145 | 0 | 95.5 | 100 | 1.42372E-14 |
| 5 | Element5 | 0 | 3.71059E-06 | 0 | 7.87469E-05 | 0 | 95.5 | 100 | 3.71059E-15 |
| 6 | Element6 | 0 | 1.2033E-06 | 0 | 2.55367E-05 | 0 | 95.5 | 100 | 1.2033E-15 |
| 7 | Element7 | | | | Non safety related | | | | |
| 8 | Element8 | 5.3552E-06 | 0 | 0 | 0 | 0 | 0 | SPF/RF only | 5.3552E-15 |
| 9 | Element9 | 0 | 2.0237E-05 | 0 | 3.03554E-05 | 0 | 60 | 100 | 2.0237E-14 |
| ... | | | | | ... | | | | ... |
| | Top level | 5.3552E-06 | 3.94643E-05 | 5.094-07 | 0.00455139 | 0 | 91.044832 | 99.8882032 | 4.48195E-14 |

SUPPORT SYSTEM AND A METHOD OF GENERATING AND USING FUNCTIONAL SAFETY DATA FOR AN ELECTRONIC COMPONENT

FIELD OF THE INVENTION

The present invention relates to a design support system and a method of generating and using functional safety data for an electronic component, such as microcontroller or application specific integrated circuit (ASIC), electronic system or other electronic apparatus.

BACKGROUND

Many systems are required to comply with safety standards. For example, automotive electric and electronic systems are required to comply with the ISO 26262 standard.

Usually analysis of a system is done in the context of a specific application being considered and, in the automotive sector, examples of applications include adaptive cruise control, airbag and braking.

Application analysis is conducted to understand a given application and to identify system components, how the components interact and how each component is used. Design partitioning is used to break down each hardware component into parts. If necessary, parts can be broken down further into sub-parts to aid the analysis. Fault probabilistic characterisation is carried out to identify plausible faults for each part or sub-part. Fault impact analysis is then performed to analyse the impact of each fault on the application. Safety mechanisms analysis is then conducted to determine how safety mechanism(s) cover significant faults. Finally, fault coverage analysis is carried out to determine the coverage offered by a given safety mechanism. This results in a set of parameters for each system for the application.

The steps depend on the application under consideration. Thus, if the application changes, then the design may need to be re-partitioned considering, for example, a different level of sub-parts and a new set of plausible faults are identified. The impact of each fault, analysis of safety mechanisms and the coverage of safety mechanisms may also need to be re-assessed.

Microcontroller units (MCUs) and application specific integrated circuits (ASICs) are widely used in automotive-related applications.

EP 1980964 A1 describes a method of performing failure mode and effects analysis (FMEA) on integrated circuits. The method includes preparing a FMEA database which includes FMEA statistics and computing FMEA results using the FMEA database. However, the FMEA statistics are specific to a particular usage. Thus, if the usage changes, then a new set of FMEA statistics is prepared. This tends to be inefficient for MCUs.

SUMMARY

According to a first aspect of the present invention there is provided a method of generating functional safety data relating to functional safety of an electronic apparatus, such as a MCUs, ASICs and other complex electronic components, comprising a plurality of elements, such as a central processing unit digital standard cell block and macros. The method comprises receiving configuration data which includes fault-related data and analysis-related data, receiving fault impact analysis data comprising data indicative of impact of one or more faults on an output of each element and receiving fault coverage analysis data comprising data indicative of an extent to which each element is covered by safety mechanism(s). The method comprises generating functional safety data using the configuration data, the fault impact analysis data and the fault coverage analysis data and storing a report including the configuration data, the fault impact analysis data, the fault coverage analysis data and the functional safety data.

This can help to simplify analysis and, thus, design of an electronic component or electronic system which includes a plurality of electronic components.

The impact may be an assumed or proposed impact, for example, provided by an electronic component developer. However, the impact may be modified, for example, by a customer. The fault impact data may be application-independent fault impact data.

Receiving the fault impact analysis data may comprise generating the fault impact analysis data. Generating the fault impact analysis data may comprise receiving a fault impact analysis fault list comprising a list of faults affecting elements and, for each fault, respective fault category data indicative of a category of fault and combining the fault category data of one or more sub-parts to obtain, for a part which comprises the one or more sub-parts, the data indicative of the impact of the one or more faults on the output of the element which is the part. The list of faults may comprise a plurality of names of element-specific faults, each name having a hierarchical name structure.

Receiving the fault coverage analysis data may comprise generating the fault coverage analysis data. Generating the fault coverage analysis data may comprise receiving a fault coverage analysis fault list comprising a list of faults and, for each fault, respective safety mechanism data for one or more safety mechanisms, wherein safety mechanism data for a given safety mechanism includes data indicating how the safety mechanism covers the fault and combining the safety mechanism data to obtain the data indicative of the extent to which each element is covered by the safety mechanism(s).

Generating the functional safety data may comprise generating lambda values and/or hardware metric values and/or probabilistic metric for random hardware failure values according to ISO 26262 standard.

The method may further comprise customising the report. The method may include retrieving the report, modifying the configuration data, the fault impact analysis data and/or fault coverage analysis data, generating modified functional safety data and storing a modified report including the modified configuration data, the modified fault impact analysis data and/or modified fault coverage analysis data, and the modified functional safety data.

According to a second aspect of the present invention there is provided a method of generating new functional safety data for a design of an electronic component which comprises a plurality of elements, i.e. customising a report. The method comprises receiving a report comprising configuration data which includes fault-related data and analysis-related data, fault impact analysis data comprising data indicative of impact of one or more faults on an output of each element, fault coverage analysis data comprising data indicative of an extent to which each element is covered by safety mechanism(s) and functional safety data generated using the configuration data, the fault impact analysis data and/or fault coverage analysis data. Customising the report comprises modifying the configuration data, the fault impact analysis data and/or fault coverage analysis data, generating modified functional safety data using modified configuration data, modified fault impact analysis data and/or modified fault coverage analysis data and storing a modified report including the modified configuration data, the modified fault impact analysis data and/or the modified fault coverage analysis data, and the modified functional safety data.

A customisable analysis report can help a developer or their customer to carry out "what if" analysis which can lead to a better design for the electronic component.

The electronic component may be an integrated circuit. For example, the integrated circuit may be a microcontroller. The microcontroller may be a microcontroller configured to be used in a vehicle chassis application. For instance, the microcontroller may include a FlexRay communication controller. The integrated circuit may be an application specific integrated circuit (ASIC).

According to a third aspect of the present invention there is provided a method of designing an electronic component. The method includes preparing a design of the electronic component, generating functional safety data for the first design of the electronic apparatus, and preparing a revised design of the electronic apparatus in dependence upon the functional safety data.

According to a fourth aspect of the present invention there is provided a method of fabricating an electronic component. The method comprises designing an electronic component and fabricating the electronic component according to the revised design.

According to a fifth aspect of the present invention there is provided a computer program which, when executed by data processing apparatus, causes the data processing apparatus to perform the method.

According to a sixth aspect of the present invention there is provided a computer program product, for example a non-transitory, comprising a computer-readable medium storing the computer program.

According to a seventh aspect of the present invention there is provided a design support system which includes data processing apparatus comprising at least one processor and at least one set of memory. The at least one processor is configured to perform the method.

According to an eighth aspect of the present invention there is provided a database storing a report which includes configuration data which includes fault-related data and analysis-related data, fault impact analysis data comprising data indicative of impact of one or more faults on an output of each element, fault coverage analysis data comprising data indicative of an extent to which each element is covered by safety mechanism(s), and functional safety data generated using the configuration data, the fault impact analysis data and the fault coverage analysis data.

According to a ninth aspect of the present invention there is provided an electronic apparatus fabricated by the method of fabrication.

BRIEF DESCRIPTION OF THE DRAWINGS

Certain embodiments of the present invention will now be described, by way of example, with reference to the accompanying drawings, in which:

FIG. 11 is a schematic diagram of configuration data;

FIG. 12 is a schematic diagram of element characterisation data;

FIG. 15 illustrates fault impact data;

FIG. 16 illustrates fault impact data showing hierarchical naming structure;

FIG. 22 illustrates a first part of a customisable analysis report;

FIG. 24 illustrates a second part of a customisable analysis report;

DETAILED DESCRIPTION OF CERTAIN EMBODIMENTS

Design Support System 1

Figure 1:
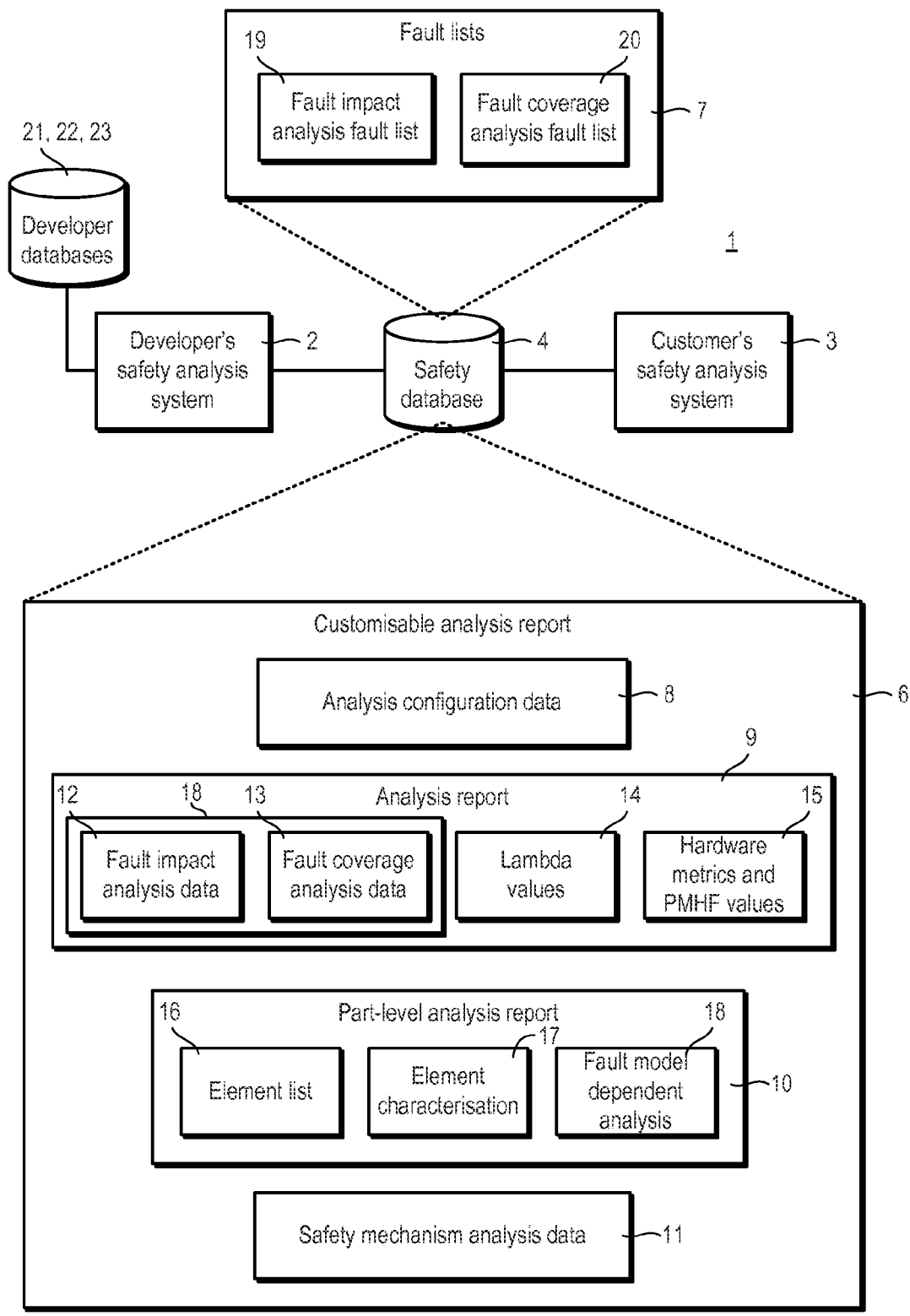
FIG. 1 is a schematic block diagram of a design support system including a safety database which stores a customisable analysis report.

Referring to FIG. 1, a design support system 1 for generating functional safety data for an electronic component, such as a microcontroller, is shown.

The design support system 1 includes a developer safety analysis system 2, a customer safety analysis system 3 and a shared database 4 that stores safety data including a customisable analysis report 6 and fault lists 7 which are used to prepare the customisable analysis report 6.

The customisable analysis report 6 includes analysis configuration data 8, an analysis report 9, a part-level analysis report 10 and a safety mechanism report 11. The analysis report 9 includes fault impact analysis data 12, fault coverage analysis data 13, lambda values 14 and hardware metric values and probabilistic metric for random hardware failure (PMHF) values 15. The part-level analysis report 10 includes a list of elements 16, element characterisation data 17 and fault dependent analysis 18. As shown in FIG. 1, the fault dependent analysis 18 comprises fault impact analysis data 12 and fault coverage analysis data 13. The fault lists 7 include a fault impact analysis fault list 19 and a fault coverage analysis fault list 20. The customisable analysis report 6 and/or fault lists 7 may be stored in the forms of a set of tables.

The fault impact analysis data 12 and fault coverage analysis data 13 need not be included in the analysis report 9. Likewise, the fault impact analysis data 12 and fault coverage analysis data 13 need not be included in the part-level analysis report 10.

The fault impact analysis data 12 and fault coverage analysis data 13 can be stored separately from the analysis report 9 and/or part-level analysis report 10. The fault impact analysis data 12 and fault coverage analysis data 13 can be duplicated (e.g. by mirroring) and stored in one of or both the analysis report 9 and/or part-level analysis report 10.

The design support system 1 also includes a set of developer databases 21, 22, 23.

As will be explained in more detail later, a developer can generate the customisable analysis report 6 when designing an electronic component, such as a microcontroller. The developer and/or the customer may change the analysis configuration data 8, fault impact analysis data 12 and fault coverage 13 and inspect the effect of doing so on the lambda values 14 and hardware metric values and PMHF values 15.

Figure 1A:
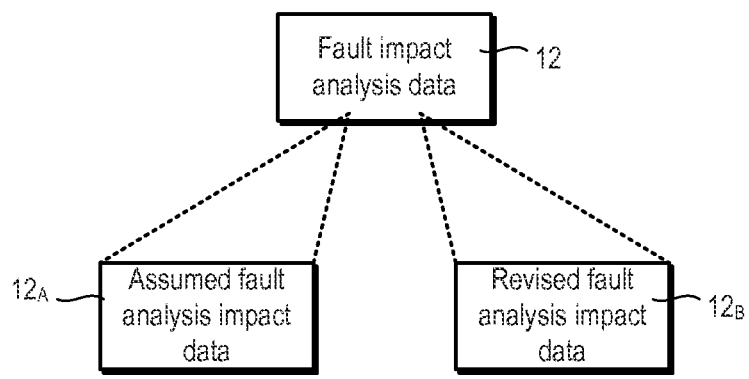
FIG. 1a illustrates fault impact analysis data.

Referring also to FIG. 1a, the fault impact analysis data 12 may comprise assumed (or "reference") fault impact analysis data $12_A$, typically provided by or generated by the developer, which gives conservative values of fault impact. The customer may change (for example, by replacing) some or all of the reference fault impact data $12_A$ with revised (or "predicted") fault impact data $12_B$ and/or add revised fault impact data $12_B$.

Figure 1B:
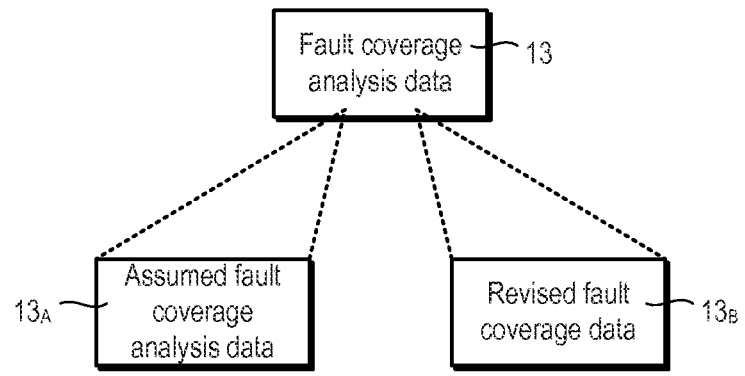
FIG. 1b illustrates fault coverage analysis data.

Referring also to FIG. 1b, the fault coverage analysis data 13 may comprise assumed (or "reference") fault coverage analysis data $13_A$, again typically provided or generated by the developer, which gives conservative values of fault coverage. The customer may change some or all of the reference fault coverage analysis data $13_A$ with (or "predicted") fault coverage analysis data $13_B$ and/or add revised fault coverage analysis data $13_B$.

Some parts of the customisable analysis report 6 may be visible to the developer, but not the customer. Some parts of the customisable analysis report 6 may be visible, but not changeable by the customer. Some parts of the customisable analysis report 6 may be changeable by the customer, but the customer may be limited to making changes to values lying in ranges or having specific values specified by the developer. Limiting the customisable analysis report 6 in one or more of these ways can help to prevent the customer from making unexpected or invalid changes.

The design support system 1 may take the form of a database and a database management system. The customisable analysis report 6 may be stored in the form of spreadsheets and text files.

Figure 2:
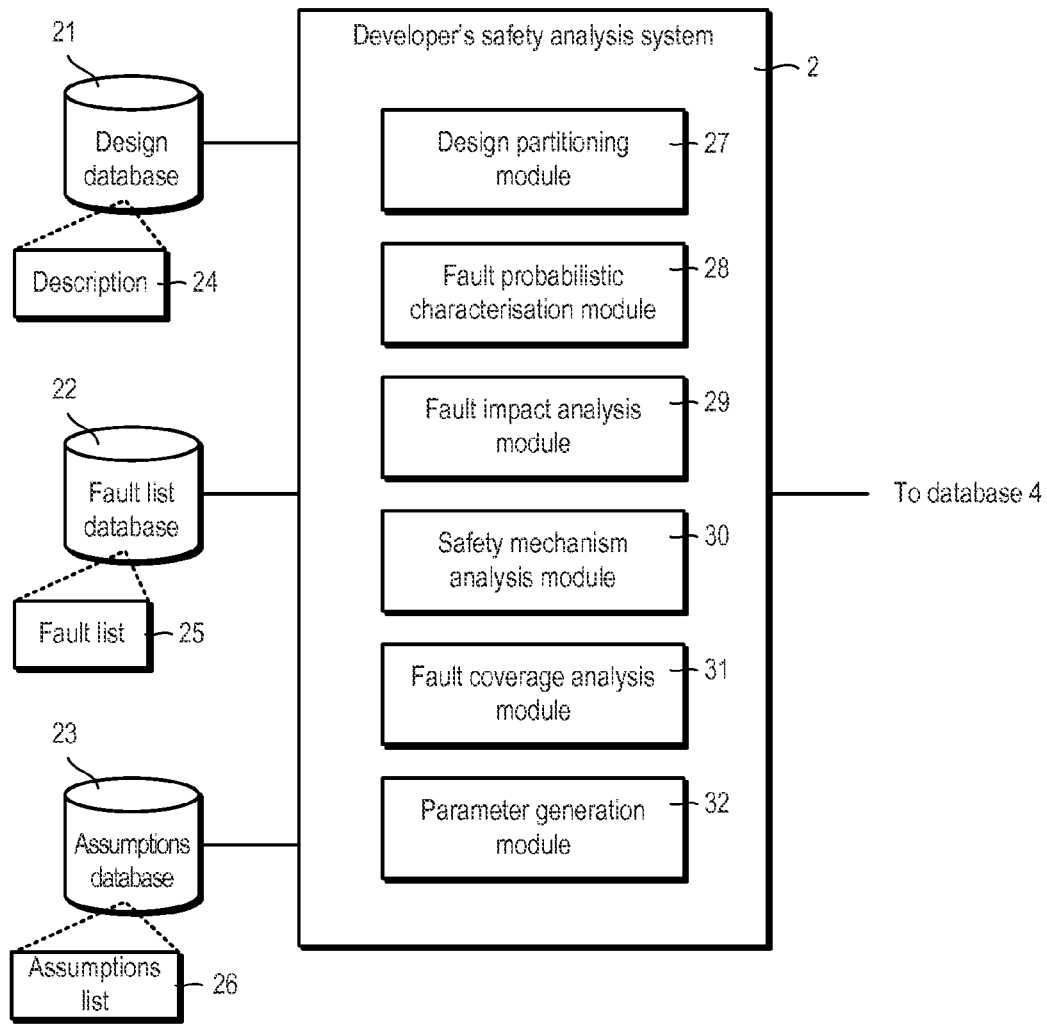
FIG. 2 is a schematic block diagram of a developer safety analysis system.

FIG. 2 illustrates the developer side of the design support system 1 in more detail.

Referring to FIG. 2, the design support system 1 includes a set of developer databases 21, 22, 23 including a design database 21, a fault list database 22 and an assumptions database 23. The design database 21 stores a description 24 of a design of an electronic component, for example in the form of a pre-layout, gate level net list which includes size information. However, the description 24 may include additional information about layout, such as distance between logic blocks. Layout information may be used to identify bridge faults. The description 24 may include information at a higher or lower level of abstraction. The description 24 may include information from more than one level of abstraction.

The fault list database 22 stores a list of possible faults 25. The fault list 25 may take the form of a table, for example in a spreadsheet or text file, listing possible faults, such as "stuck at 0" or "stuck at 1".

The assumptions database 23 stores assumptions 26 about how the electronic component will be used. The assumptions 26 may take the form of a table, for example a spreadsheet or text file, listing assumptions, such as "Assumption 1: System is using an external watchdog that will generate a reset if not cleared every 10 milliseconds".

The developer safety analysis system 2 includes modules 27, 27, 29, 30, 30, 32 for generating the customisable analysis report 6. The developer safety analysis system 2 includes a design partitioning module 27, a fault probabilistic characterisation module 28, a fault impact analysis module 29, a safety mechanism analysis module 30, a fault coverage analysis module 31 and a safety parameter generation module 32.

Operation of the modules 27, 28, 29, 30, 31, 32 will be described in more detail later.

Figure 3:
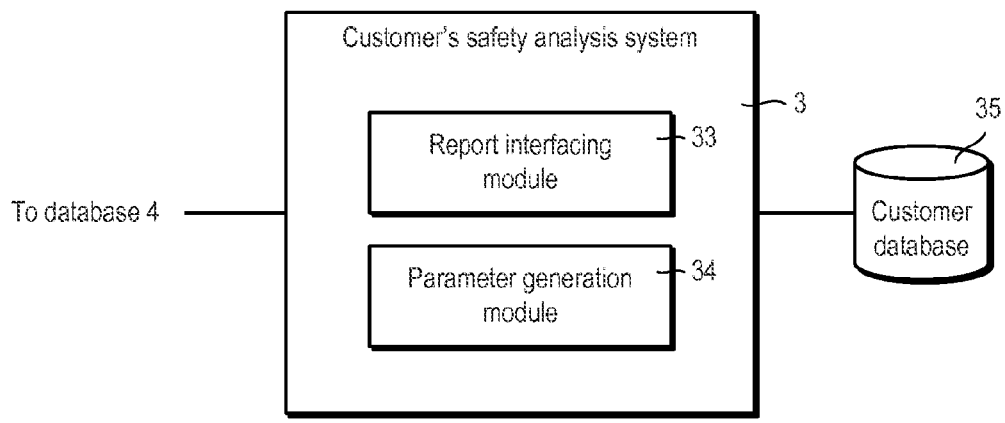
FIG. 3 is a schematic block diagram of a customer safety analysis system.

FIG. 3 illustrates the customer side of the design support system 1 in more detail.

Referring to FIG. 3, the customer safety analysis system 3 includes a report interfacing module 33 and, optionally, a parameter generation module 34. The customer safety analysis system 3 may accesses customer databases(s) 35. The customer safety analysis system 3 may include one or more modules 27, 28, 29, 30, 31, 32 which are the same or similar to those of the developer safety analysis system 2. In some examples, the customer safety analysis system 3 may mirror the developer safety analysis system 2 and so include the same modules 27, 28, 29, 30, 31, 32 for generating the customisable analysis report 6.

Figure 4:
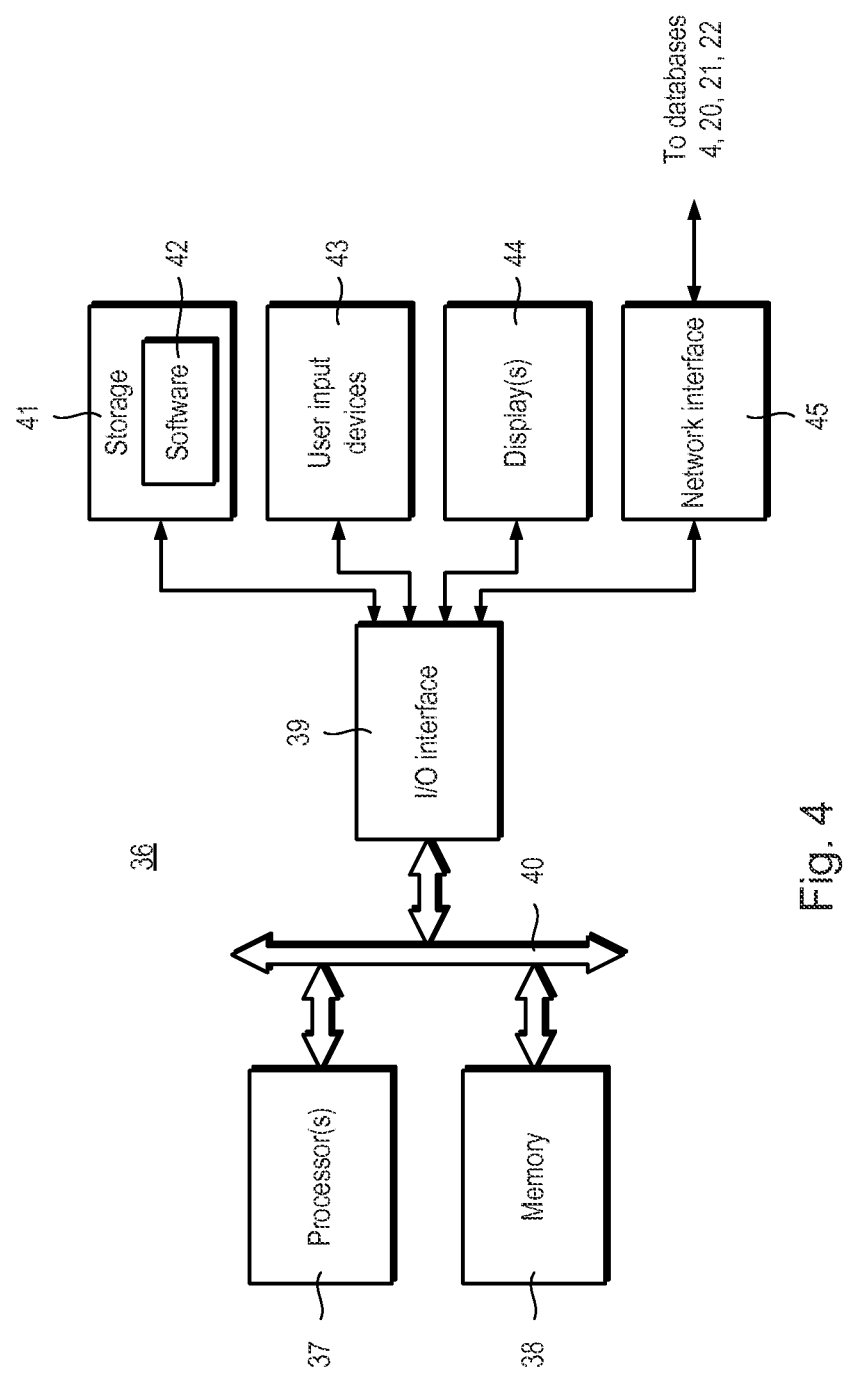
FIG. 4 is a schematic block diagram of a computer system.

Referring to FIG. 4, the developer safety analysis system 2 may be implemented in a distributed system comprising a plurality of networked computer systems 36.

Each computer system 36 includes at least one processing core 37, memory 38 and input/output interface 39 interconnected by a bus system 40. The computer system 36 includes local storage 41 which stores design support software 42 for implementing one or more of the modules 27, 28, 29, 30, 39, 32. However, the design support software 42 can be stored on an application server (not shown). The computer system 36 also includes user input devices 43 (such as keyboards and/or pointing device(s)), one or more displays 44 and a network interface 45. The network interface 45 provides a connection to other computer systems 36 and to one or more of the databases 4, 21, 22, 23. The customer safety analysis system 3 can be implemented in the same or a similar system.

The design support system 1 allows a developer and customer to collaborate during development of an electronic component. Using the system 1 and the processes described herein, a systematic approach can be followed to quantify the safety capabilities of an electronic component and assess its development. The design support system 1 can speed up process of designing the electronic component.

Overview of Safety Analysis

Figure 5:
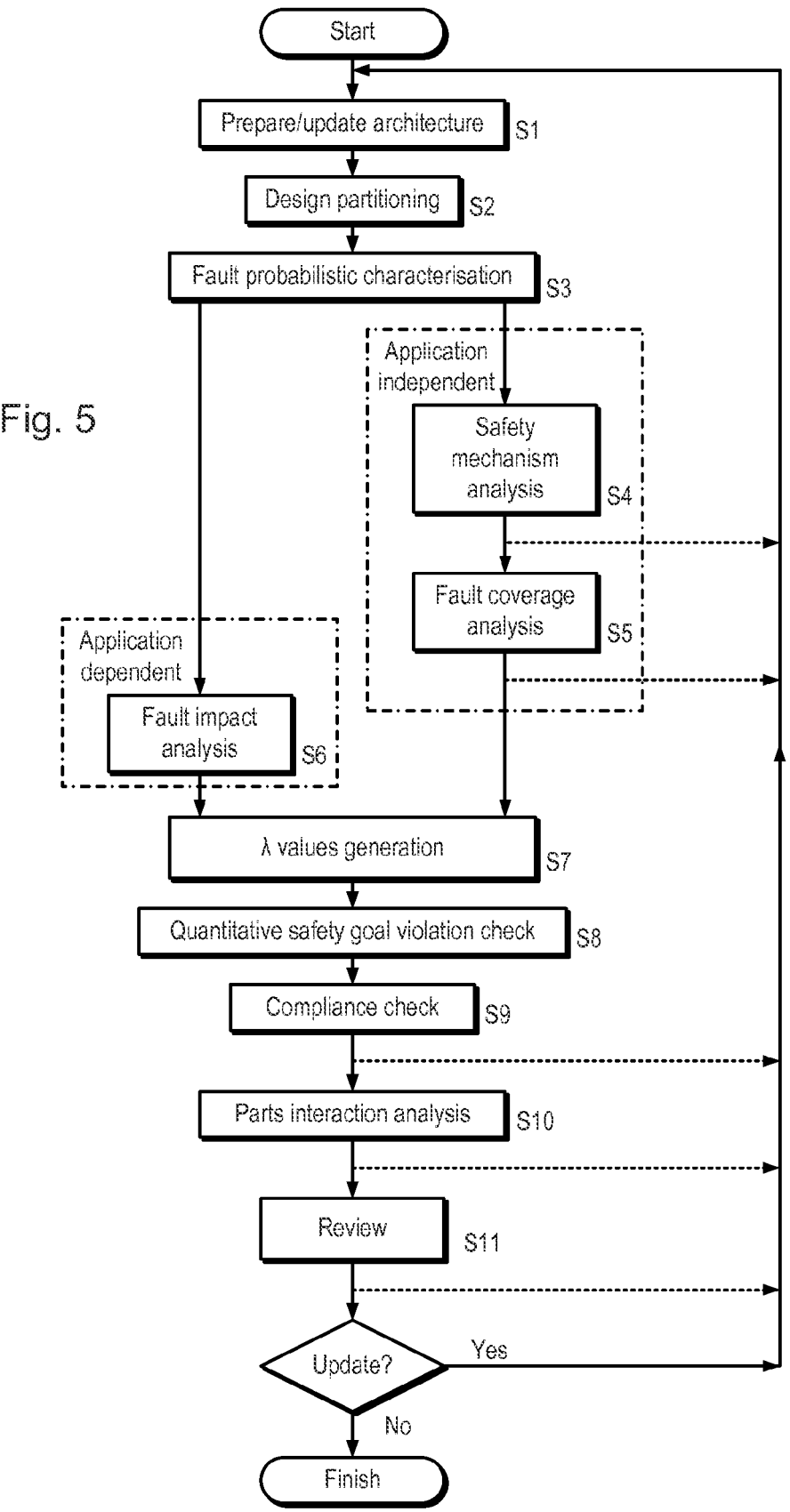
FIG. 5 is a design support process flow diagram.
Figure 6:
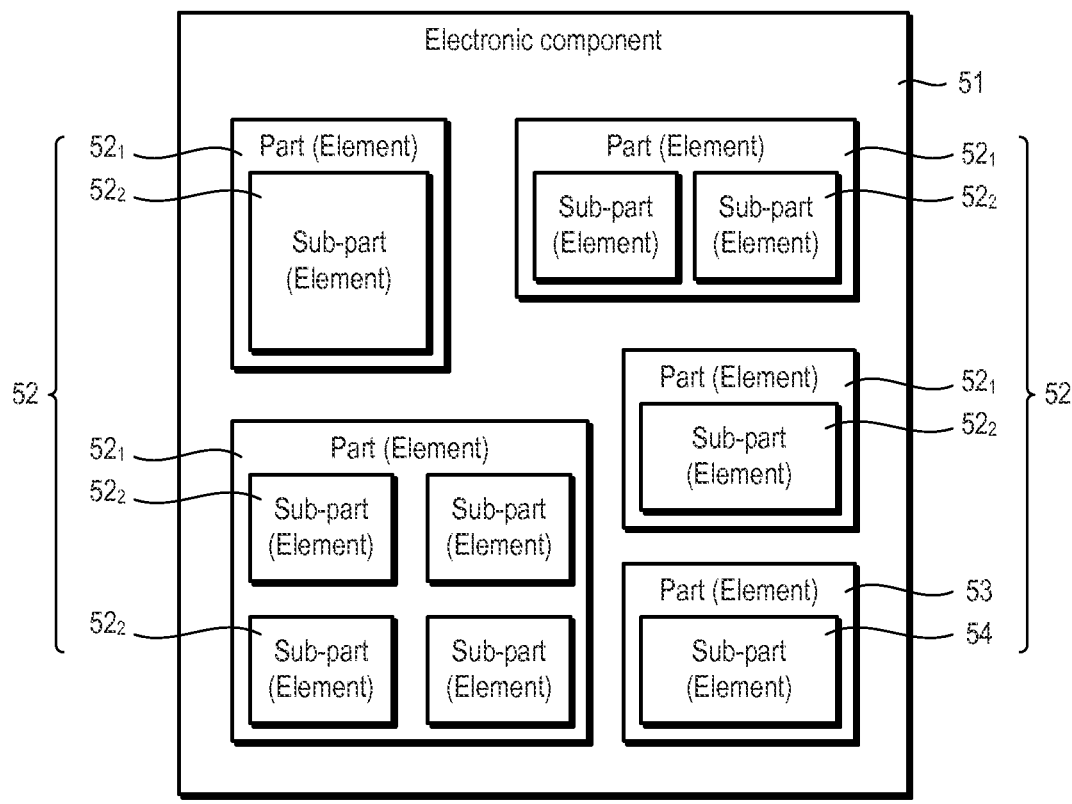
FIG. 6 is a schematic block diagram of a design of an electronic component.

Referring to FIGS. 1, 5 and 6, an overall approach to analysing functional safety capabilities of an electronic component is shown. Herein, the example of a microcontroller will be used. However, the approach may be applied to other types of integrated circuits such as system-on-a-chip (SoC), memory, application-specific integrated circuit (ASIC), analog IC, mixed signal IC and power IC, as well as other electronic components. The approach may be applied to electronic systems which comprise a plurality of electronic components.

A design 51 for an electronic component, in this example a microcontroller, is prepared (step S1).

The design 51 is partitioned to define elements 52 which include parts 52$_1$, such as CPU cores, embedded memory and communication units, and sub-parts 52$_2$, such as macros and digital standard cell blocks (step S2).

Once the elements 52 have been identified, physical defects with the potential to affect each element 52 are identified and each element 52 is characterised by allocating a failure rate, measured in units of failures in time (FIT) (which is the number of failures expected per $10^9$ device-hours of operation), to the element 52, by assigning one or more fault models to the element 52 and, if there is more than one fault model, by assigning a distribution of a failure rate between the different fault models (step S3).

Safety mechanisms, such as self-checking logic or loop back logic, embedded in the microcontroller or which are assumed to be outside the microcontroller, are identified and their properties are investigated (step S4). As will be explained in more detail later, a safety mechanism can be implemented fully in hardware, fully in software or using both hardware and software, or be provided outside the microcontroller. Once the safety mechanisms have been identified, the overall effectiveness of safety mechanisms is determined (step S5).

Independent of any consideration of safety mechanisms, the impact of faults on elements 52 is determined (step S6). As will be explained in more detail later, assumptions about the usage of the microcontroller can be made.

Once fault coverage and fault impact have been evaluated, fault classification is undertaken which yields failure rates and hardware metrics for the microcontroller (step S7).

The results 14, 15 are output in a report 6 and stored in the safety database 4. As will be described in more detail later, the report 6 is customisable. The developer and/or customer can change input parameters to see how the results 14, 15 change.

Probability of safety goal violations due to random hardware failures can be evaluated (step S8). A check can be made of results compliance against quantitative targets (step S9). This includes checking hardware metrics values and probabilistic metric for random hardware failure (PMHF)/cut-set methods against defined targets to check for plausibility and compliance. Interaction between on-chip modules can be analysed (step S10).

A review of the safety analysis, hardware metric values and PMHF/cut-set results is made (step S11). The design may be updated (step S1) and the process repeated until a satisfactory design is realized.

Steps S2 to S8 will now be described in more detail.

Design Partitioning

Figure 7:
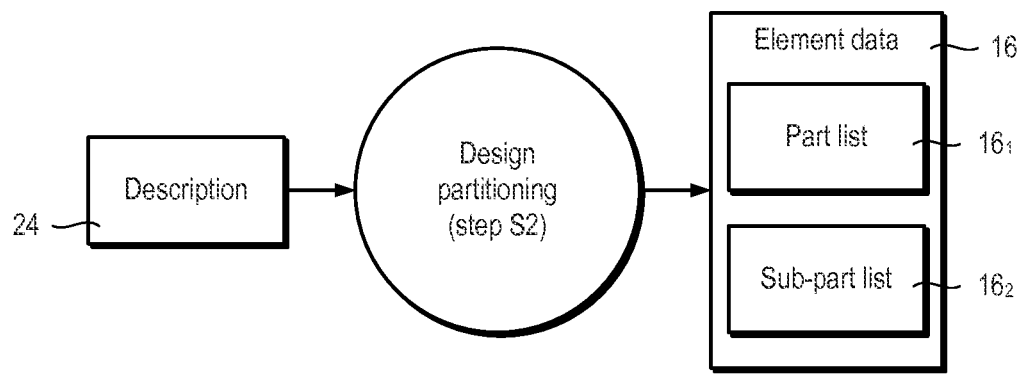
FIG. 7 illustrates a design partitioning process.

Referring to FIGS. 1, 6 and 7, the microcontroller design 51 is partitioned to define the elements 52 which include parts 52$_1$ and sub-parts 52$_2$.

Firstly, the microcontroller design 51 is divided into a plurality of parts 52$_1$ which serve different functions.

A part 52$_1$ can fall into one of several groups or "classes", such as a processing unit, non-volatile memory, volatile memory, data transfer unit, system control unit, interface unit, time unit, communication unit, a safety unit and a debugging and test unit.

A processing unit may take the form of a CPU core, a co-processor, memory management unit, cache controller or interrupt controller. Non-volatile memory may take the form of Flash memory. Volatile memory may take the form of embedded SRAM. A data transfer unit may be a DMA Controller, internal/external bus controller or arbiter. A system control unit may take the form of a power management unit, clock control, voltage control. An interface unit may take the form of an I/O ports, an analog-to-digital converter or a digital-to-analog converter. A time unit may take the form of a timer unit or internal watch-dog. A communication unit may take the form of a FlexRay unit, a CAN unit, a SPI unit, a UART unit, an I2C unit, or Ethernet unit. A safety unit may take the form of an embedded watch dog or memory protection unit. A debugging and testing unit may comprise a user debug control and hardware for mass production testing.

Secondly, each part 52$_1$ is split into one or more sub-parts 52$_2$. A sub-part 52$_2$ is the lowest hierarchical level that is analyzed. A sub-part 52$_2$ can be a macro or a set of macros, or a block of digital standard cells. A macro is an implementation of a circuit function and the circuit may be digital, analog or mixed signal. The sub-part 52$_2$ can be part of a circuit, a circuit or a group of circuits.

As shown in FIG. 7, design partitioning results in a list 16 of elements 52 (herein referred to as "element list") (step S2). The element list 16 may be split into two lists 16$_1$, 16$_2$ including a first list 16$_1$ for parts 52$_1$ ("part list 16$_1$") and a second list 16$_2$ for sub-parts 52$_2$ ("sub-part list 16$_2$").

A hierarchical naming scheme can be used to name the elements 52. For example, a part 52$_1$ may be labelled "part_name", such as "cvm" or "cpu", and a sub-part 52$_2$ may be named "part_name.sub-part_name", such as "cvm.mux" or "cpu.cpl". A part 52$_1$ may be divided and subdivided (i.e. into intermediate parts) to reach sub-parts 52$_2$. Thus, three or more hierarchical levels may be defined. For example, a part 52$_1$ labelled "cmv" may include sub-parts 52$_2$ labelled "cvm.vcc.out1", "cvm.vcc.out2" and "cvm.vcc.out3".

Figures 8, 9, 10:
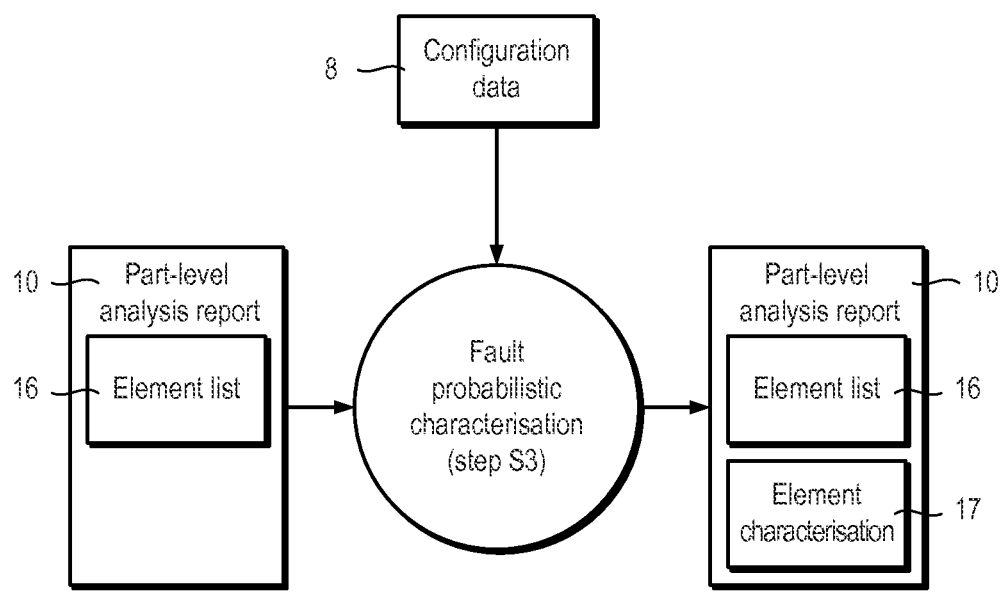
FIG. 8 illustrates a list of parts.
FIG. 9 illustrates a list of sub-parts.
FIG. 10 illustrates a fault probabilistic characterisation process.

Referring also to FIG. 8, the part list 16$_1$ includes a set of entries 53*a* (shown as rows). Each entry 53*a* includes a first field 54*a* containing an element identifier (ID) identifying the part 52$_1$ and a second field 55*a* contains an element name for the part 52$_1$.

Referring also to FIG. 9, the sub-part list 16$_2$ may include, for example, a set of entries 53*b*, each entry 53*b* including a first field 54*b* containing an element identifier (ID) identifying the sub-part 52$_2$, a second field 55*b* containing an element name for the sub-part 52$_2$ and a third field 56 containing a part identifier (IDP) linking the sub-part to the parent part.

Parts in the part list 16$_1$ can also be included in the sub-part list 16$_2$. For example, the element 'Part2' in the part list 16$_1$ may be 'cpu' and have element identifier '2'. The element 'Element2' in sub-part list 16$_2$ may be 'cpu'. The element 'Element3' in the sub-part list 16$_2$ may be 'alu' which is a sub-part of the cpu. Both elements share the same part identifier 56, but are allocated different element identifiers 54*b* in sub-part list 16$_2$.

The sub-part list 16$_2$ is used for generating functional safety data. The part list 16$_1$ can be used, for example, to prepare the sub-part list 16$_2$ and/or to prepare a high-level summary. The part list 16$_1$ can be omitted. The part list 16$_1$ and sub-part list 16$_2$ are stored as separate tables.

The element list 16 is stored in the safety database 4 in the part-level analysis report 10. However, some or all of the element list 16 can be stored in other parts of the customisable analysis report 6. The element list 16 can also be stored separately outside the customisable analysis report 6.

Fault Probabilistic Characterisation

The primary aim of fault probabilistic characterisation is to help to determine a failure rate for an element 52 (FIG. 6) which may be attributed to one or more types of fault which are described by respective fault models. Examples of faults include, for instance, a stuck-at fault, a bridging fault, an open fault and a delay fault.

Referring to FIG. 10, configuration data 8 and a partially-completed part-level analysis report 10 containing the list of elements 16 are supplied to the fault probabilistic characterisation module 28 (FIG. 2) (step S3). Under user instruction, information about fault models and failure rates are extracted from the configuration data 8 and assigned to elements 52 (FIG. 6) by populating the part-level analysis report 10 with element characterisation data 17.

The configuration data 8 is generally divided into two sections, namely declaration and values sections. The declaration section includes a set of fields containing attributes including configuration class (such as "FC"), configuration item (i.e. a code or nickname used to refer to a parameter value during analysis, such as "failure_rate_digital") and a description of the configuration class. The values section includes a set of fields including a first field containing a value of the configuration item (which may be a numerical value or text) and, optionally, one or more additional fields containing additional values of configuration items.

Other sets of data, including the analysis report 9 and the part-level analysis report 10, are arranged in the same way. Each set of data is divided into two or more sections, each section containing at least one field storing values of at one attribute.

FIG. 11 shows the configuration data 8 in more detail.

Referring to FIG. 11, the configuration data 8 is divided into several sections $8_1$, $8_2$, $8_3$ using the configuration class field (not shown). For clarity, each section $8_1$, $8_2$, $8_3$ of the configuration data 8 is shown in a different table.

The first section $8_1$ of the configuration data 8 includes a set of entries 58 (in FIG. 11 shown as rows) containing information about failure rates. Each entry 58 include a first attribute field 59 containing the name of a failure rate characteristic, a second attribute field 60 containing a value of failure rate and a third attribute field 61 containing the unit of the failure rate characteristic (for example $\mu m^2$). Characteristic values can be obtained from handbooks and sources such as IEC 62380 or Siemens SN 29500, or reliability tests undertaken by or on behalf of the developer. The first section $8_1$ of the configuration data 8 can assign a failure value per unit area, per unit number of gates or per unit number of bits. As will be explained in more detail later, a developer can provide a set of predefined failure rate characteristics and failure rate values. However, the developer and/or customer can add new or change failure rate characteristics and can add and/or change failure rate values.

The second part $8_2$ of the configuration data 8 includes a set of entries 62 providing fault characterisation information. Each entry 62 includes a first attribute field 63 containing a fault characterisation name and n-pairs of attribute fields $64_1$, $65_1$, $64_2$, $65_2$, $64_3$, $65_3$, $64_4$, $65_4$ containing fault model attributes. Only four pairs of fields are shown. For each fault model, a pair of fields $64_1$, $65_1$, $64_2$, $65_2$, $64_3$, $65_3$, $64_n$, $65_n$ includes a field $64_1$, $64_2$, $64_3$, $64_n$, containing a fault model name and a field $65_1$, $65_2$, $65_3$, $65_n$ containing a value of fault model distribution expressed as a percentage. For a given fault characteristic, the distributions add up to 100%.

The third part $8_3$ of the configuration data 8 includes a set of entries 66 defining analysis parameters. Each entry 66 includes a first attribute field 67 containing the name of parameter 67 (such as fault tolerant time interval), a second attribute field 68 containing a value of the parameter value and a third attribute field 69 containing the unit of the parameter (for example, seconds).

As shown in FIG. 10, fault probabilistic characterisation results in element characterisation data 17.

FIG. 12 shows element characterisation data 17 in more detail.

Referring to FIG. 12, the element characterisation data 17 includes a set of entries 70, each entry 70 including a first attribute field 71 containing an element identifier (ID) and a second attribute field 72 containing an element name, a third attribute field 73 containing an indicator marking whether or not a part is relevant to safety, a fourth attribute field 74 containing a fault characterisation name and a fifth attribute field 75 containing a failure rate characteristic name.

The element characterisation data 17 can also include size information relating to the element.

The element characterisation data 17 is stored in the safety database 4 (FIG. 1) as a section in the part-level analysis report 10.

Fault Impact Analysis

The main aim of fault impact analysis is to determine the impact of a fault occurring in an element 52 (FIG. 6).

A fault can fall into one of three categories:

Firstly, a fault may be a direct violation fault (DVF) which, in the absence of any safety mechanism, has the potential to violate a safety goal directly. A fault which is categorized as being a direct violation fault and which is not covered by a safety mechanism can lead to an ISO 26262 single point fault (SPF) or an ISO 26262 residual fault (RF).

Secondly, a fault may be an indirect violation fault (IVF) which, only in combination with one or more other faults, has the potential to violate a safety goal. A fault which is categorized as being an indirect violation fault can lead to an ISO 26262 multiple point failure (MPF).

Thirdly, a fault may be a no violation fault (NVF) which, even in combination with one or more other faults, does not have the potential to violate a safety goal. A fault which is categorized as being a no violation fault can be categorised as an ISO 26262 safe fault (SF).

Fault impact can be determined by the user, for example by looking at the influence of a fault on control and data signals transmitted on communication paths, or by a tool.

Figure 13:
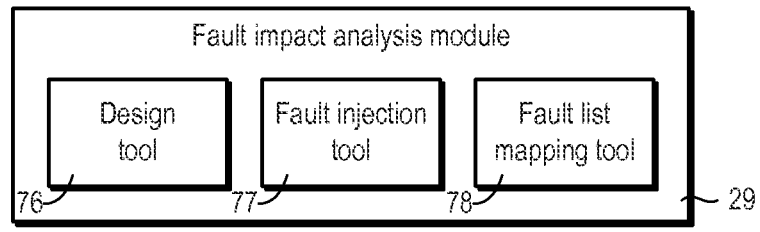
FIG. 13 is a schematic block diagram of a fault impact analysis module.

Referring to FIG. 13, the fault impact analysis module 29 includes a design tool 76, a fault injection tool 77 and a fault list mapping tool 78.

Figure 14:
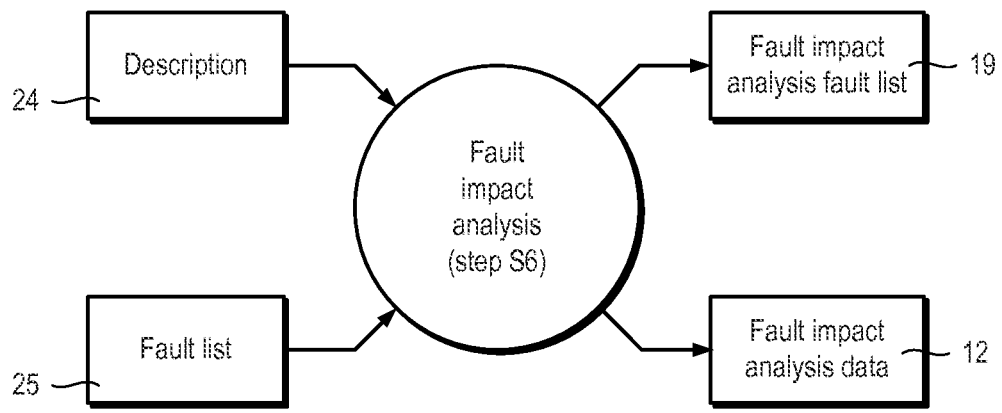
FIG. 14 illustrates a fault impact analysis process.

Referring also to FIG. 14, the design description 24 and fault list 25 are supplied to the fault impact analysis module 29 and the fault impact analysis fault list 18 and fault impact analysis data 12 are generated (step S6).

FIG. 15 shows the fault impact analysis fault list 18 in more detail.

Referring to FIG. 15, the fault impact analysis fault list 18 includes a set of entries 79, each entry 79 includes a first attribute field 80 containing a fault name (or "path") and a set of three attribute fields $81_1$, $81_2$, $81_3$ which indicate to which category the fault belongs, namely whether the fault is a single point fault, an indirect violation fault or a no violation fault.

Referring also to FIG. 16, the fault impact analysis fault list 18 lists paths hierarchically and groups faults according to element into groups 82. For example, a fault may be "core.cpu.alu.node1" where nodes is a node of the arithmetic logic unit, which is an element of the central processing unit, which in turn is an element of the core. In another example, a fault may be "core.cpu.node7" where node7 is a node of the central processing unit, which is an element of the core.

The hierarchical path naming structure allows faults for a particular element 52 (FIG. 6) to be identified and counted. For example, the number of faults in the central processing unit can be found by counting the number of instances of "core.cpu.*" (where * is the rest of the path) and the number of faults in the arithmetic logic unit can be found by counting the number of instances of "core.cpu.alu.*" and so on.

Figure 14A:
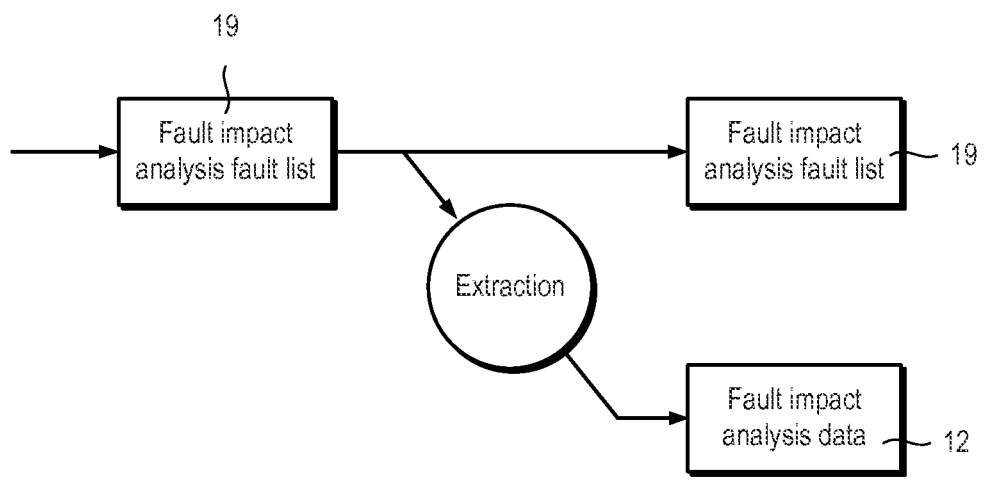
FIG. 14a illustrates a fault impact analysis sub-process.

Referring also to FIG. 14a, the fault impact analysis data 12 is extracted by the fault mapping tool 78 from the fault impact analysis fault list 18. The tool 78 counts how many faults are in the list 18 for a given element and counts the number of DVF category faults, the number of IVF category faults and the number of NVF category faults for the element. The tool 78 then computes the ratio of the number of faults for a given category and the total number of faults, and expresses the ratio as a percentage.

For example, using the fault impact fault list 18 shown in FIG. 16 (assuming there are no other faults for the central processing unit), the fault impact analysis data 12 is extracted with the result that, at the arithmetic logic unit level, DVF (%)=IVF (%)=NVF (%)=33% (i.e. one fault in each category and three faults in total) and, at central processing unit level, DVF (%)=60% and IVF (%)=NVF (%)=20% (i.e. three faults in DVF category and five faults in total).

The fault impact analysis fault list 18 is stored in the safety database 4 (FIG. 1) and the fault impact analysis data 12 are stored in the safety database 4 (FIG. 1) as a section in the analysis report 9 (FIG. 1).

Safety Mechanism Analysis

The primary aim of safety mechanism analysis is to identify and analyse safety mechanisms which are embedded in the microcontroller (or other electronic component), implemented by software and/or be provided by hardware or software outside the microcontroller.

Figures 17, 18:
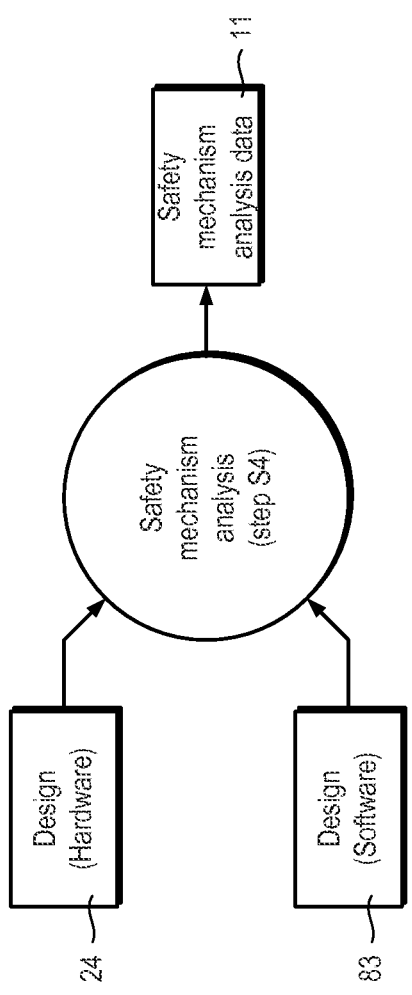
FIG. 17 illustrates a safety mechanism analysis process.
FIG. 18 illustrates safety mechanism analysis data.

Referring to FIG. 17, safety mechanism analysis is conducted by the user by inspecting the design 24 and considering software design 83, identifying whether hardware logic provides a safety mechanism and, if so, identifying whether the safety mechanism is implemented fully by the hardware (software is only used, for example, to enable or disable the safety mechanism or to read out the result of a test) (herein referred to as a hardware safety mechanism or "HW SM") or whether the safety mechanism is provided in part by the hardware and in part by software (herein referred to as a hardware supporting software safety mechanism or "HW supporting SW SM") (step S4). For example, in the case of a hardware safety mechanism, a self test logic may convert a test value and write the result to a dedicated register (not shown) and software may read-out the value. For example, in the case of hardware supporting software safety mechanism, a loop back mode can be used to identify faults, but the safety mechanism depends on the type of test carried by the software.

Once logic has been classified as being a hardware safety mechanism, the behaviour of the safety mechanism is identified. Generally, a safety mechanism falls into one of three classes, namely detection only ("D"), control only ("C") and detection and control ("CD").

A D-class safety mechanism is only able to notify upper layers (not shown) about the presence of a fault (the upper layers are responsible to complete implementation of fail-safe behaviour of the system). A C-class safety mechanism has the ability to mitigate the effect of the fault within the same or lower layers (there is no need for the upper layers to implement any additional actions to have fail-safe system assuming proper behaviour of control logic). A CD-class safety mechanism has the ability to mitigate the effect of the fault within the same layer or lower layers and additionally provide notification to upper layers that the fault has occurred and has been managed.

FIG. 18 shows safety mechanism data report 11 in more detail.

Referring to FIG. 18, the safety mechanism analysis report 11 includes a set of entries 84 (in FIG. 18 shown as rows), one entry 84 for each safety mechanism. Each entry 84 includes a first attribute field 85 containing an identifier (ID), a second attribute field 86 containing a safety mechanism name, a third attribute field 87 containing the name or names of primary element(s) which the safety mechanism has been designed to cover, a fourth attribute field 88 containing the name or names of other element(s) which are covered by the safety mechanism even if it was not designed to cover, a fifth attribute field 89 which contains an enable control, a sixth attribute field 90 which contains the safety mechanism class, a seventh attribute field 91 which contains a value of diagnostic test interval (DTI) which is the time interval between consecutive checks of the safety mechanism on the target element(s) and an eighth attribute field 92 which contains the value of fault reaction time (FRT) which is the interval between detection of a fault and completion of reaction to the fault by the safety mechanism or upper layer (not shown).

The safety mechanism data 11 is stored in the safety database 4 (FIG. 4).

Fault Coverage Analysis

The main aim of fault coverage is to determine the overall effectiveness of safety mechanisms against faults affecting each element 52 (FIG. 6).

Fault coverage can be determined by the user by looking at the safety mechanism and determining fault coverage for a given element.

Figure 19:
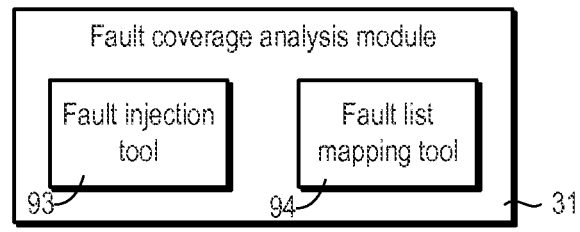
FIG. 19 is a schematic block diagram of a fault coverage analysis module.

Referring to FIG. 19, the fault coverage analysis module 31 may include a fault injection tool 93 and a fault list mapping tool 94.

Figure 20:
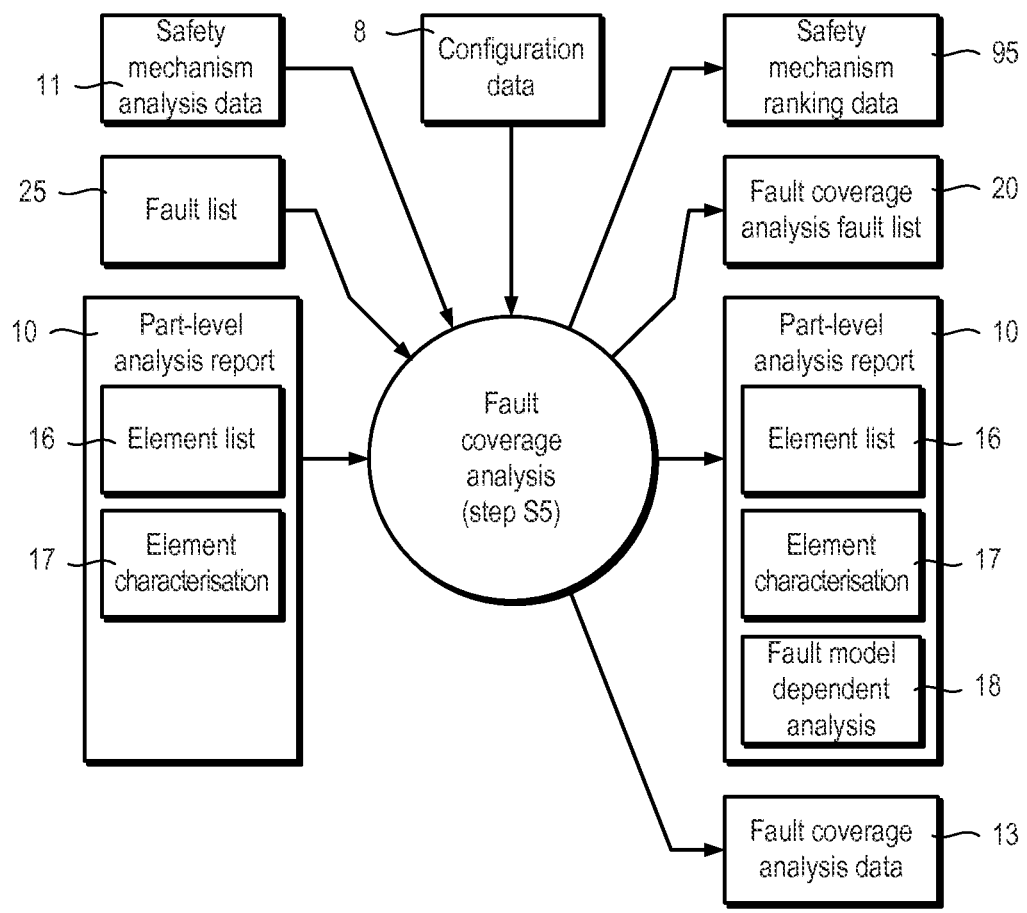
FIG. 20 illustrates a fault coverage analysis process.

Referring to FIG. 20, fault coverage analysis is conducted by the user by inspecting the safety mechanism analysis data n and fault list 25 and determining which faults are covered by which safety mechanisms (step S5). It is possible for more than one safety mechanism to act on the same fault. As well as generating fault coverage analysis fault list 20 and fault coverage analysis data 13 which identifies all the safety mechanisms covering each fault, fault coverage analysis also generates safety mechanism ranking data 95 for each part. The safety mechanism ranking data 95 lists the safety mechanism and ranks them according to degree of coverage.

Figures 20A, 21:
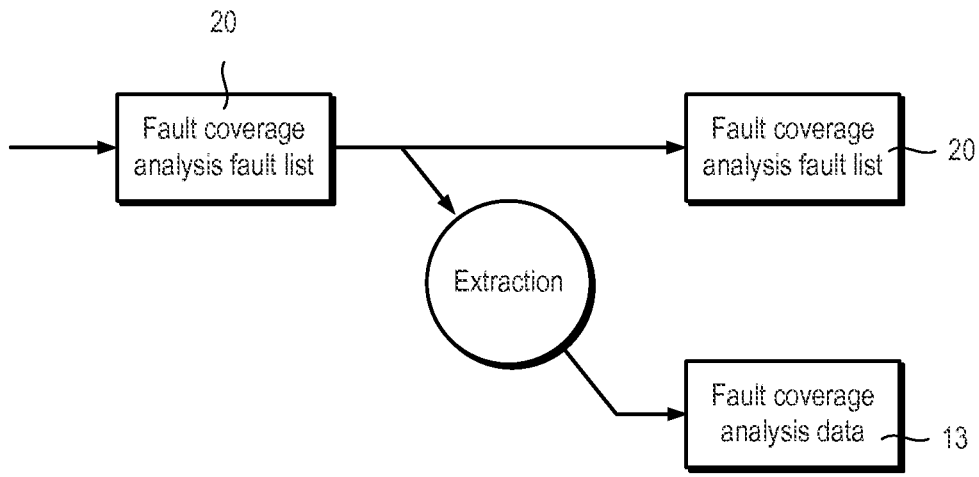
FIG. 20a illustrates a fault coverage analysis sub-process.
FIG. 21 illustrates fault coverage analysis data.

FIG. 21 shows the fault coverage analysis fault list 20 in more detail.

Referring to FIG. 21, the fault coverage analysis fault list 20 includes a set of entries 96, each entry 96 comprising a first attribute field 97 containing a fault name and a set of attribute fields $98_1$, $99_1$, $98_2$, $99_2$, $98_3$, $99_3$, $98_4$, $99_4$ containing information for each safety mechanism $100_1$, $100_2$, $100_3$, $100_4$ as to whether it can correct and/or detect a given fault.

In FIG. 21, only four safety mechanisms are shown. However, there may be more than four safety mechanisms.

The fault coverage analysis fault list 20 lists paths hierarchically and groups faults according to element in the same way as the fault impact analysis fault list 18.

Referring also to FIG. 20a, the fault coverage analysis data 13 is extracted by the fault mapping tool 94 from the fault coverage analysis fault list 20. Extraction in fault coverage analysis is carried out a similar way to extraction performed in fault impact analysis.

The fault coverage analysis fault list 20 and safety mechanism ranking data 95 are stored in the safety database 4 (FIG. 1). The fault model dependent analysis data 13 are stored in the safety database 4 (FIG. 1) as a section in the analysis report 9 (FIG. 1). The fault coverage analysis data 13 are stored in the safety database 4 (FIG. 1) as a section in the analysis report 9 (FIG. 1).

λ Values Generation

FIG. 22 shows an element analysis section $9_1$ of the analysis report 9.

The element analysis section $9_1$ forms part of the customisable analysis report 6 (FIG. 1) and can be inspected by the developer and/or customer. As shown in FIG. 22, the element analysis section $9_1$ can be presented in the form of a table.

As will be explained in more detail later, the developer and/or customer can change the configuration data 8 (FIG. 11), element characterisation data 17 (FIG. 12), the impact of each fault, update fault coverage for each element 52 (FIG. 6) and change safety mechanism characteristics to carry out "what if" analysis.

The report 9 is progressively populated with data by the fault impact analysis module 29 (FIG. 1), the fault coverage analysis module 31 (FIG. 1) and the parameter generation module 32 (FIG. 1).

Referring to FIG. 22, the element analysis report $9_1$ includes a set of entries 101, each entry including a first attribute field 102 containing an identifier (ID), a second attribute field 103 containing an element name, a third attribute field 104 containing a fault model name, fourth, fifth and sixth attribute fields containing values $105_1$, $105_2$, $105_3$ indicative of the category of fault, a seventh attribute field 106 containing safety mechanism identifier and a set of attribute fields $107_{11}$, $107_{12}$, $107_{13}$, $107_{14}$ containing safety mechanism correction/detection/combined/uncovered information. Only one safety mechanism and corresponding safety mechanism information is shown in FIG. 22.

Once fault impact analysis data 12 and fault coverage analysis data 13 have been generated and/or collated, a set of safety parameters and hardware metrics can be generated.

Figure 23:
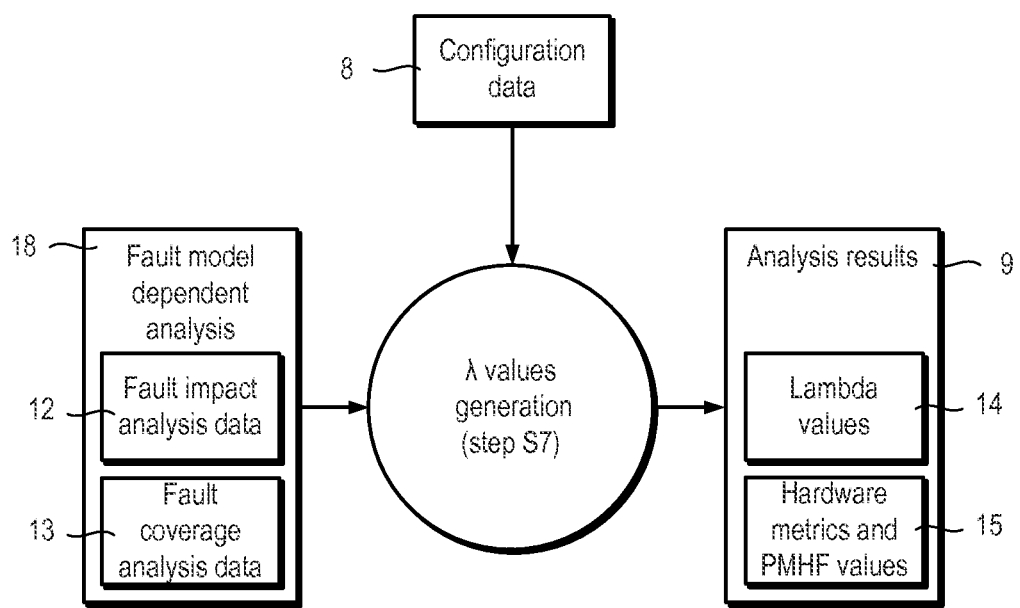
FIG. 23 illustrates a lambda values generation process.

Referring to FIGS. 1 and 23, the configuration data 8, the fault impact analysis data 12 and fault coverage analysis data 13 are supplied to the parameter generation module 32 (FIG. 2) which generates a set of values of λ parameters 14 and hardware metric values and PMHF values 15 in according to ISO 26262 (step S7). In this example, a partially-completed analysis report 9 is provided which includes the fault impact analysis data 12 and fault coverage analysis data 13. However, the fault impact analysis data 12 and fault coverage analysis data 13 may be provided in a different way. For example, the fault model dependent analysis 18 which includes fault impact analysis data 12 and fault coverage analysis data 13 may be provided separately from the analysis report 9.

The parameter generation module 32 receives, among other configuration data 8, fault mapping rules whereby, depending on the fault category (i.e. DVF, IVF or NVF) and on how the fault is covered by safety mechanism(s) (i.e. C, D or CD), it can assign a fault to an ISO 262626 fault class, such as single-point fault (SPF), residual fault (RF), multiple-point fault latent (MPF_LAT), multiple-point fault detected (MPF_DET) and safe fault (SAFE), and, thus, calculate failure rates or λ parameters 14 and hardware metric values and PMHF values 15 according to ISO 26262. Table 1 below gives an example of a set of fault mapping rules.

TABLE 1

| Fault category | Coverage | | ISO 26262 classification |
|---|---|---|---|
| | C | D | |
| DVF | X | | MPF_LAT |
| DVF | | X | MPF_DET |
| DVF | X | X | MPF_DET |
| DVF | | | SPF |
| IVF | X | | MPF_LAT |
| IVF | | X | MPF_DET |
| IVF | X | X | MPF_DET |
| IVF | | | MPF_LAT |

However, other fault-mapping rules can be used.

FIG. 24 shows a high-level analysis section $9_2$ (herein also referred to as a "summary section") of the analysis report 9.

The summary section $9_2$ is generated using data from the element analysis section $9_1$. The summary section $9_2$ of the report 9 also forms part of the customisable analysis report 6 (FIG. 1) and can be inspected by the developer and/or customer. As shown in FIG. 22, the second section $9_1$ of the analysis report 9 can be presented in the form of a table. The first and second sections $9_1$, $9_2$ can be presented as separate tables or together, for example, in a single table.

Referring to FIG. 24, the summary section $9_2$ includes a set of entries in, each entry including a first attribute field containing an identifier (ID) 112, a second attribute field 113 containing element name, a set of attribute fields 114, 115, 116, 117, 118 containing values of failure rates or "λ-values" (each expressed as a value of FIT) including SPF, RF, MPF_LAT, MPF_DET and SAFE, a set of attribute fields 119, 120 containing values of hardware metrics (each expressed as a percentage) including single-point fault metric (SPFM) and latent fault metric (LFM) and an attribute field 121 containing a probabilistic metric for random hardware failures (PMHF) (expressed as a value of FIT).

In addition to failure rates and hardware metrics for individual elements comprised in the electronic component, the summary section $9_2$ also includes a so-called "top-level" entry 122 which includes a set of attribute fields containing aggregated values of failure rates and hardware metrics for the electronic component. The value for each failure rate is obtained by summing the contributions of all the elements. Values of aggregated "top-level" hardware metrics are calculated from the aggregated failure rates.

The analysis report 9 is stored in the safety database 4 (FIG. 1).

Customising the Customisable Analysis Report 9

Referring to FIGS. 1, 3, 11, 22 and 24, the configuration data 8 and the analysis report 9 can be accessed by the customer's safety analysis system 3 via an interfacing module 33.

Through the interfacing module 33, the user has the option to alter or change at least some of the configuration data 8 and values contained in the first part $9_1$ of the analysis report 9 and generate a new set of λ values 14 and hardware metric values and PMHF values 15. This allows the user to carry out "what if" analysis to see how the safety data 6 are affected in response to changing, for example, the application profile and/or component configuration.

Figure 25:
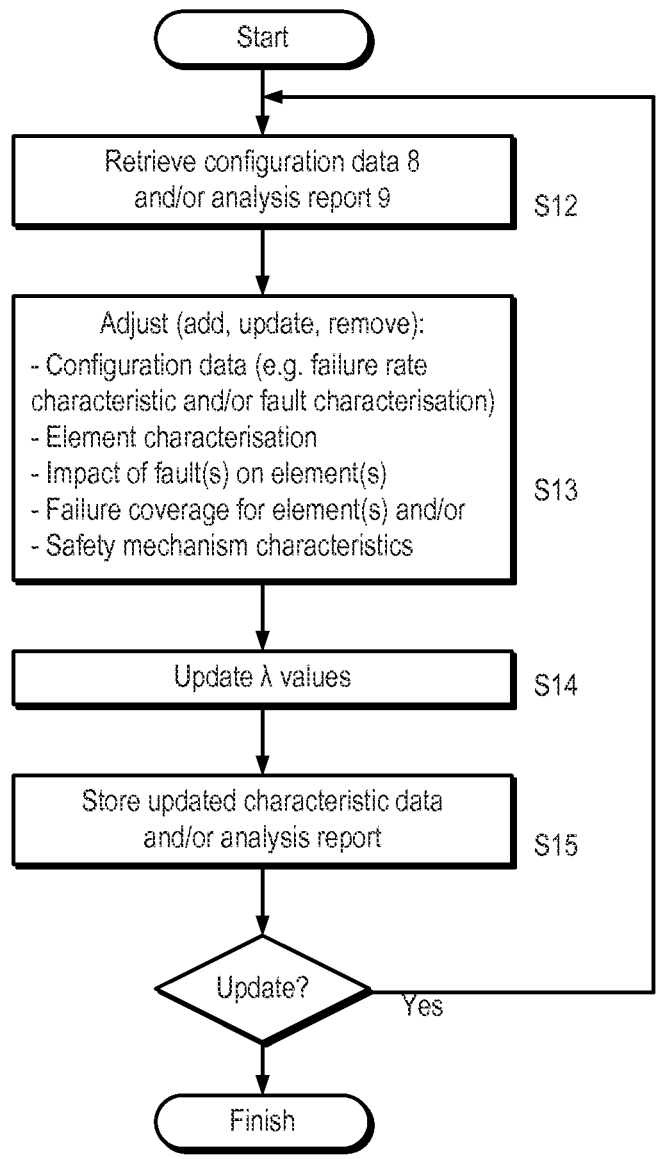
FIG. 25 is a flow diagram of a method of updating a customisable analysis report.

Referring also to FIG. 25, the interfacing module 33 retrieves the configuration data 8, analysis report 9, the part-level analysis report 10 and the safety mechanism analysis data 11 (step S12). The user can adjust the impact of fault(s) on element(s), failure coverage for element(s) and/or safety mechanism characteristics (step S13).

Referring in particular to FIG. 11, the customer may select and/or de-select FIT sources in the first section 8₁ of the configuration data 8. Additionally or alternatively, the customer may add new FIT sources to the configuration data 8. The customer may select and/or de-select fault characterisation and change distribution of fault models and failure modes in the second section 8₂ of the configuration data 8. Additionally or alternatively, the customer may add new fault characterisations to the second part 8₂ of the configuration data 8. The customer may modify analysis parameters, such as fault tolerant interval time, in the section part 8₃ of the configuration data 8.

Referring in particular to FIG. 22, the customer may change the impact of each fault on each element, update fault characteristics for each element and/or change safety mechanism characteristics. The customer may add new safety mechanism.

Once the changes have been made, the interfacing module 33 instructs the parameter generation module 34 to generate a new set of λ values 14 and hardware metric values and PMHF values 15 (step S14).

The updated or new version of the analysis report 9 is stored in the safety database 4. The safety database 4 may store successively-generated analysis reports 9. This can allow the developer and/or the customer to review the analysis reports 9. Updated or new versions of the configuration data 8 can also be stored. Thus, the safety database 4 may store different versions of configuration data 8 and/or analysis reports 9.

The process can be continued until a satisfactory design has been found and which comply with the ISO 26262 standard.

The use of a customisable analysis report 6 can help to facilitate and speed up design of an electronic component, particularly one which is complex, such as a microcontroller or application specific integrated circuit. It can also help to designers to test a design more rigorously and extensively and so can help to improve safety.

Electronic Component Fabrication

Once a design has been finalised, the electronic component can be fabricated based on the design.

Figure 26:
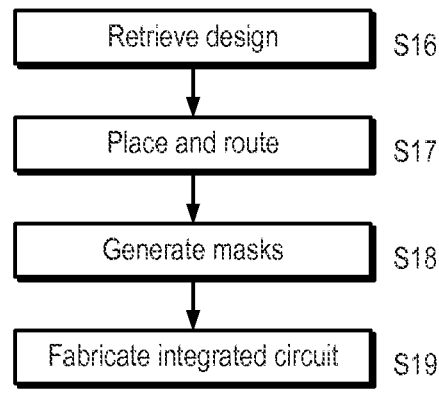
FIG. 26 is a flow diagram of a method of fabricating an electronic component.
Figure 27:
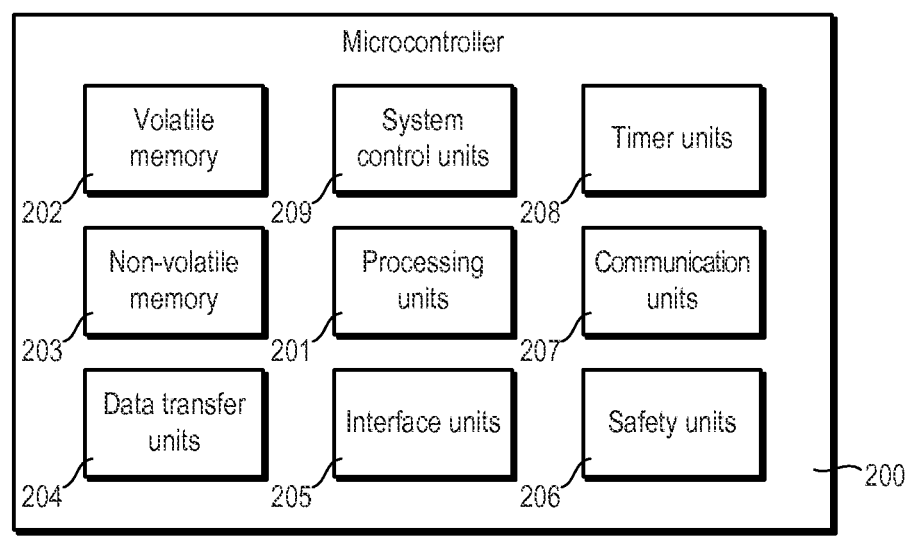
FIG. 27 is a schematic block diagram of an electronic component.

Referring to FIGS. 26 and 27, fabrication of a microcontroller 200 will be briefly described.

Based upon a design (step S16), a layout is generated (step S17). A set of lithographic masks are made based on the layout (step S18). Using the masks, a semiconductor wafer is processed using microelectronic fabrication techniques, such as lithography, deposition and etching, to fabricate the microcontroller 200 (step S19).

FIG. 27 is a schematic block diagram of a fabricated microcontroller 200.

The microcontroller 200 includes processing units 201, volatile memory 202, non-volatile memory 203, data transfer units, 204, interface units 205, safety units 206, communication units 208 and timer units 209.

It will be appreciated that many modifications may be made to the embodiments hereinbefore described.

The design support system can be used to design other types of integrated circuits, such as application-specific integrated circuits. The design support system can be used to design other forms of electronic component. The design support system can be used to design electronic, optoelectronic and other data processing apparatus.

The invention claimed is:

1. A method of generating functional safety data for a design of an electronic component which comprises a plurality of elements, the method comprising:
   receiving configuration data which includes fault-related data and analysis-related data;
   receiving fault impact analysis data comprising data indicative of impact of one or more faults on an output of each element;
   receiving fault coverage analysis data comprising data indicative of an extent to which each element is covered by safety mechanism(s);
   generating functional safety data using the configuration data, the fault impact analysis data and the fault coverage analysis data; and
   storing a report including the configuration data, the fault impact analysis data, the fault coverage analysis data and the functional safety data,
   wherein receiving the fault coverage analysis data comprises generating the fault coverage analysis data and wherein generating the fault coverage analysis data comprises:
      receiving a fault coverage analysis fault list comprising a list of faults and, for each fault, respective safety mechanism data for one or more safety mechanisms, wherein safety mechanism data for a given safety mechanism includes data indicating how the safety mechanism covers the fault; and
      combining the safety mechanism data to obtain the data indicative of the extent to which each element is covered by the safety mechanism(s).

2. A method according to claim 1, wherein receiving the fault impact analysis data comprises generating the fault impact analysis data.

3. A method according to claim 2, wherein generating the fault impact analysis data comprises:
   receiving a fault impact analysis fault list comprising a list of faults affecting elements and, for each fault, respective fault category data indicative of a category of fault; and
   combining the fault category data of one or more sub-parts to obtain, for a part which comprises the one or more sub-parts, the data indicative of the impact of the one or more faults on the output of the element which is the part.

4. A method according to claim 3, wherein the list of faults comprises a plurality of names of element-specific faults, each name having a hierarchical name structure.

5. A method according to claim 1, wherein generating the functional safety data comprises generating lambda values and/or hardware metric values and/or probabilistic metric for random hardware failure values according to ISO 26262 standard.

6. A method comprising:
   generating functional safety data according to claim 1;
   retrieving the report;
   modifying the configuration data, the fault impact analysis data and/or fault coverage analysis data;
   generating modified functional safety data; and
   storing a modified report including the modified configuration data, the modified fault impact analysis data and/or modified fault coverage analysis data, and the modified functional safety data.

7. A method according to claim 1, wherein the electronic component is a microcontroller or application specific integrated circuit.

8. A method of designing an electronic component, the method including:
   preparing a design of the electronic component;
   generating functional safety data according to claim 1 for a first design of the electronic component;
   preparing a revised design of the electronic component in dependence upon the functional safety data.

9. A method of fabricating an electronic component, the method comprising:
   designing an electronic component according to claim 8; and
   fabricating an electronic component according to the revised design.

10. An electronic component fabricated by a method according to claim 9.

11. A non-transitory computer readable medium storing thereon a computer program which, when executed by data processing apparatus, causes the data processing apparatus to perform a method according to claim 1.

12. A design support system which includes data processing apparatus comprising:
   at least one processor; and
   memory;
   wherein the least one processor is configured to perform a method according to claim 1.

13. A method of generating functional safety data for a design of an electronic component which comprises a plurality of elements, the method comprising:
   receiving a report comprising configuration data which includes fault-related data and analysis-related data, fault impact analysis data comprising data indicative of impact of one or more faults on an output of each element, fault coverage analysis data comprising data indicative of an extent to which each element is covered by safety mechanism(s) and functional safety data generated using the configuration data, the fault impact analysis data and/or fault coverage analysis data;
   modifying the configuration data, the fault impact analysis data and/or fault coverage analysis data;
   generating modified functional safety data using modified configuration data, modified fault impact analysis data and/or modified fault coverage analysis data; and
   storing a modified report including the modified configuration data, the modified fault impact analysis data and/or the modified fault coverage analysis data, and the modified functional safety data,
   wherein the fault coverage analysis data is generated using a fault coverage analysis fault list comprising a list of faults and, for each fault, respective safety mechanism data for one or more safety mechanisms, wherein safety mechanism data for a given safety mechanism includes data indicating how the safety mechanism covers the fault and by combining the safety mechanism data to obtain the data indicative of the extent to which each element is covered by the safety mechanism(s).

14. A database storing a report which includes:
   configuration data which includes fault-related data and analysis-related data;
   fault impact analysis data comprising data indicative of impact of one or more faults on an output of each element;
   fault coverage analysis data comprising data indicative of an extent to which each element is covered by safety mechanism(s); and
   functional safety data generated using the configuration data, the fault impact analysis data and the fault coverage analysis data,
   wherein the fault coverage analysis data is generated using a fault coverage analysis fault list comprising a list of faults and, for each fault, respective safety mechanism data for one or more safety mechanisms, wherein safety mechanism data for a given safety mechanism includes data indicating how the safety mechanism covers the fault and by combining the safety mechanism data to obtain the data indicative of the extent to which each element is covered by the safety mechanism(s).

* * * * *